United States Patent
Auffinger et al.

(10) Patent No.: US 11,788,573 B2
(45) Date of Patent: Oct. 17, 2023

(54) MULTI-COMPONENT MELT ELECTROMAGNETIC EFFECT PROTECTION CAP SYSTEM

(71) Applicant: THE BOEING COMPANY, Chicago, IL (US)

(72) Inventors: Sean Auffinger, Ladson, SC (US); Terrell Riley, Summerville, SC (US)

(73) Assignee: The Boeing Company, Chicago, IL (US)

( * ) Notice: Subject to any disclaimer, the term of this patent is extended or adjusted under 35 U.S.C. 154(b) by 484 days.

(21) Appl. No.: 16/420,948

(22) Filed: May 23, 2019

(65) Prior Publication Data

US 2020/0370590 A1    Nov. 26, 2020

(51) Int. Cl.
| | |
|---|---|
| *F16B 33/00* | (2006.01) |
| *B29C 65/00* | (2006.01) |
| *F16B 37/14* | (2006.01) |
| *B29C 65/08* | (2006.01) |
| *B29K 701/12* | (2006.01) |
| *B29L 31/30* | (2006.01) |
| *B64D 45/02* | (2006.01) |

(52) U.S. Cl.
CPC ............ *F16B 37/14* (2013.01); *B29C 65/08* (2013.01); *F16B 33/004* (2013.01); *B29K 2701/12* (2013.01); *B29L 2031/3076* (2013.01); *B64D 45/02* (2013.01)

(58) Field of Classification Search
CPC ........ F16B 33/00; F16B 33/004; F16B 37/00; F16B 37/10; F16B 37/14; B29C 65/00; B29C 65/08
See application file for complete search history.

(56) References Cited

U.S. PATENT DOCUMENTS

| | | |
|---|---|---|
| 1,368,637 A | 2/1921 | McFarland |
| 1,868,084 A | 7/1932 | Wheelwright |
| 2,020,522 A | 11/1935 | Seguin |
| 3,699,368 A | 10/1972 | Palmer |
| 4,013,190 A | 3/1977 | Wiggins et al. |

(Continued)

FOREIGN PATENT DOCUMENTS

| | | |
|---|---|---|
| CA | 2856687 A1 | 3/2015 |
| CA | 2858461 A1 | 3/2015 |

(Continued)

OTHER PUBLICATIONS

Extended EP Search Report for EP Application No. 19204019.4 dated Mar. 30, 2020.

(Continued)

*Primary Examiner* — Jacob T Minskey
*Assistant Examiner* — Matthew Hoover
(74) *Attorney, Agent, or Firm* — Quinn IP Law

(57) ABSTRACT

A protection cap assembly for enclosing an end portion of a fastener which extends through a structure of an aircraft includes a cap member having a sidewall defining an opening and an interior space wherein the opening is aligned with the interior space for receiving the end portion of the fastener through the opening and into the interior space and an end surface for abutting the structure. The protection cap assembly further includes a projection secured to and which extends from the end surface of the sidewall of the cap member.

27 Claims, 13 Drawing Sheets

(56) References Cited

U.S. PATENT DOCUMENTS

| | | |
|---|---|---|
| 4,295,766 A | 10/1981 | Shaw |
| 4,519,974 A | 5/1985 | Bravenec et al. |
| 4,630,168 A | 12/1986 | Hunt |
| 4,636,446 A | 1/1987 | Lee |
| 4,826,380 A | 5/1989 | Henry |
| 4,850,778 A | 7/1989 | Clough et al. |
| 4,884,933 A | 12/1989 | Preusker et al. |
| 5,108,853 A | 4/1992 | Feres |
| 5,350,266 A | 9/1994 | Espey et al. |
| 5,752,794 A | 5/1998 | Krawczak |
| 6,053,683 A | 4/2000 | Cabiran |
| 6,102,128 A | 8/2000 | Bridgeman |
| 6,318,942 B1 | 11/2001 | Wieczorek |
| 7,134,666 B2 | 11/2006 | Beyssac et al. |
| 7,755,876 B2 | 7/2010 | Morrill et al. |
| 7,918,081 B2 | 4/2011 | Schlichting et al. |
| 7,936,550 B2 | 5/2011 | Morrill et al. |
| 8,318,942 B2 | 11/2012 | Zhang |
| 8,388,293 B2 | 3/2013 | Hutter, III |
| 8,711,541 B2 | 4/2014 | Umemoto et al. |
| 8,717,735 B2 | 5/2014 | Day et al. |
| 8,717,736 B2 | 5/2014 | Asahara et al. |
| 8,840,740 B2 | 9/2014 | Rorabaugh et al. |
| 8,894,338 B2 | 11/2014 | Dobbin et al. |
| 9,133,874 B2 | 9/2015 | Hill |
| 9,188,226 B2 | 11/2015 | Pajel et al. |
| 9,228,604 B2 | 1/2016 | Dobbin |
| 9,764,854 B2 * | 9/2017 | Dobbin .................. F16B 33/004 |
| 10,151,337 B2 | 12/2018 | Hill |
| 10,501,202 B2 | 12/2019 | Roper et al. |
| 10,655,667 B2 | 5/2020 | Stevens et al. |
| 10,920,818 B2 | 2/2021 | Cowan et al. |
| 10,948,004 B2 | 3/2021 | Auffinger et al. |
| 10,962,043 B2 | 3/2021 | Stevens et al. |
| 10,982,704 B2 | 4/2021 | Auffinger et al. |
| 10,989,244 B2 | 4/2021 | Auffinger et al. |
| 11,022,164 B2 | 6/2021 | Roper et al. |
| 11,078,947 B2 | 8/2021 | Roper et al. |
| 11,236,777 B2 | 2/2022 | Stevens et al. |
| 11,571,595 B2 | 2/2023 | Damazo et al. |
| 2002/0192052 A1 | 12/2002 | Ruspa |
| 2008/0137259 A1 | 6/2008 | Heeter et al. |
| 2009/0128983 A1 | 5/2009 | Martin Hernandez |
| 2009/0194297 A1 | 8/2009 | Ortiz Teruel |
| 2010/0303582 A1 | 12/2010 | Choi et al. |
| 2012/0217673 A1 | 8/2012 | Hutter, III |
| 2013/0206759 A1 | 8/2013 | Wurz et al. |
| 2013/0223951 A1 | 8/2013 | Bessho et al. |
| 2014/0048198 A1 | 2/2014 | Dobbin et al. |
| 2014/0261956 A1 | 9/2014 | Wiseman et al. |
| 2014/0341675 A1 | 11/2014 | Dobbin |
| 2014/0373359 A1 | 12/2014 | Schomaker et al. |
| 2015/0060465 A1 | 3/2015 | Limbacher et al. |
| 2015/0082603 A1 | 3/2015 | Rawdon et al. |
| 2015/0086295 A1 | 3/2015 | Cameron et al. |
| 2015/0184688 A1 | 7/2015 | Dobbin et al. |
| 2015/0345533 A1 | 12/2015 | Hill |
| 2016/0131179 A1 | 5/2016 | Prouty et al. |
| 2017/0021209 A1 | 1/2017 | Damazo et al. |
| 2017/0050746 A1 * | 2/2017 | Dobbin .................. F16B 37/14 |
| 2017/0082131 A1 | 3/2017 | Bessho et al. |
| 2019/0241276 A1 | 8/2019 | Dobbin |
| 2021/0164513 A1 | 6/2021 | Cowan et al. |
| 2021/0190124 A1 | 6/2021 | Stevens et al. |

FOREIGN PATENT DOCUMENTS

| | | |
|---|---|---|
| CN | 105408642 A | 3/2016 |
| CN | 105473445 A | 4/2016 |
| CN | 107298182 A | 10/2017 |
| CN | 107448463 * | 12/2017 |
| CN | 107448463 A | 12/2017 |
| DE | 1085586 B | 7/1960 |
| EP | 2610506 A1 | 7/2013 |
| EP | 2698318 A2 | 2/2014 |
| EP | 2713065 A2 | 4/2014 |
| EP | 2812248 A1 | 12/2014 |
| EP | 2860410 A1 | 4/2015 |
| EP | 2860411 A1 | 4/2015 |
| EP | 2996941 A1 | 3/2016 |
| EP | 3027917 A1 | 6/2016 |
| EP | 3059170 A1 | 8/2016 |
| EP | 3106380 A1 | 12/2016 |
| EP | 3287362 A1 | 2/2018 |
| EP | 3462046 A1 | 4/2019 |
| EP | 3546374 A1 | 10/2019 |
| GB | 612381 A | 11/1948 |
| JP | H02102910 A | 4/1990 |
| JP | H03125911 U | 12/1991 |
| JP | H08-145032 A | 6/1996 |
| JP | 2000039010 A | 2/2000 |
| JP | 2001165138 A | 6/2001 |
| JP | 2002266832 A | 9/2002 |
| JP | 2004169853 A | 6/2004 |
| RU | 2014128760 A | 2/2016 |
| WO | WO-9729289 A1 | 8/1997 |
| WO | WO-0057069 A1 | 9/2000 |
| WO | WO-2009063063 A1 | 5/2009 |
| WO | WO-2012147645 A1 | 11/2012 |
| WO | WO-2012170672 A1 | 12/2012 |
| WO | WO-2013117756 A1 | 8/2013 |
| WO | WO-2013178985 A1 | 12/2013 |
| WO | WO-2014118117 A1 | 8/2014 |
| WO | WO-2014118510 A1 | 8/2014 |
| WO | WO-2014184722 A1 | 11/2014 |
| WO | WO-2015015153 A1 | 2/2015 |
| WO | WO-2015025130 A1 | 2/2015 |

OTHER PUBLICATIONS

Written Opinion for EP Application No. 19204019.4 dated Mar. 30, 2020.
Extended EP Search Report for EP Application No. 19207962.2 dated Mar. 26, 2020.
European Search Report for EP Application No. EP19217717 dated May 8, 2020.
Http://www.ppgaerospace.com/getmedia/9a234ec3-1db9-48de-94f7-c212ac2ba705/SealCapFlyer.pdf.aspx, PPG Aerospace PRC Seal Caps, retrieved Sep. 7, 2016.
Http://www.porex.com/files/documents/Porex-Battery-Vents-Letter-English, Porex Battery Vents, 2013.
Extended European Search Report for foreign counterpart EP Application No. 16173069, dated Nov. 17, 2016.
Product Literature for ERG Duocel Aluminum Foam, downloaded from ERO Aerospace website, www.ergaerospace.com/literature/erg_duocel.pdf, Jul. 9, 2015.
"HRL Researchers Develop World's Lightest Material," downloaded from HRL Laboratories website, www.hrl.com/hrlDocs/pressreleases/2011/prsRls_111117, Jul. 10, 2015.
Daniel J. Cowan et al., U.S. Appl. No. 15/964,340, filed Apr. 27, 2018.
Bart Stevens et al., U.S. Appl. No. 15/718,618, filed Sep. 28, 2017.
Sean Auffinger et al., U.S. Appl. No. 16/046,316, filed Jul. 26, 2018.
Bart Stevens et al., U.S. Appl. No. 15/960,835, filed Apr. 24, 2018.
Toulouse, Mixed Metal-Composite Assembly, May 2013.
Hutchinson Proprietary Document, Accessories: TP Nutcaps, 1 page.
Click Bond Cap dated May 16, 2016, 4 pgs.
Extended European Search Report for EP Application No. 18196707.6 dated Feb. 19, 2019.
EP Search Report for Application No. EP14175808 dated Mar. 6, 2015.
PRC-Desoto International, Inc., "Technical Data Sheet Aerospace Sealants Customized Sealant Solutions PRC(R) Seal Caps," May 1, 2017, Lit, #4086, Sylmar, CA, pp. 1-2; retrieved on Dec. 4, 2018, retrieved from internet: http://www.ppgaerospace.com/getmedia/9a234ec3-1db9-48de-94f7-c212ac2ba705/SealCapFlyer.pdf.aspx.
Porex Corporation, "Porex(R) Battery Vents—Flame Arrestors," Porex Advanced Porous Materials, PXT-621-080513-00, Jan. 1,

(56) References Cited

OTHER PUBLICATIONS 2013, pp. 1-2, retrieved on De. 4, 2018, retrieved from internet: http://www.porex.com//files/documents/POREX-Battery-Vents-Letter-for-Web.pdf.
"Customized Sealants Solutions: PRC® Seal Caps," PPG Aerospace, product literature downloaded from ppaerospace.com on Sep. 7, 2016.
"HRL Researchers Develop World's Lightest Material," downloaded from HRL Laboratories website, HRL.com on Jul. 10, 2015.
"ERG Duocel® aluminum foam," product literature downloaded from ERG Aerospace website, ERGaerospace.com on Jul. 9, 2015.
Office Action for RU Application No. 2018127328/07 dated May 20, 2019.
EP Search Report for EP Application No. 19167831.7 dated Aug. 29, 2019.
EP Search Report for Application No. EP19166688 dated Aug. 29, 2019.
EP Office Action for Application No. 19166688.2 dated Sep. 20, 2019.
European Search Report for Application No. 19179944.4 dated Sep. 10, 2019.
Communication Pursuant to Article 94(3) dated Oct. 16, 2019.
Extended European Search Report for EP Application No. 21161373.2 dated Jul. 21, 2021.
Extended European Search Report for EP Application No. 20176033.7 dated Oct. 23, 2020.
Communication Pursuant to Article 94(3) EPC for EP Application No. 19167831.7 dated Feb. 23, 2022.
First Office Action for CN Application No. 2019103311537 dated Feb. 22, 2022.
Search Report for CN Application No. 2019103311537 dated Feb. 22, 2022.
Notification of First Office Action for CN Application No. 2019103416596 dated Mar. 7, 2022.
Extended European Search Report for EP Application No. 22152477.0 dated Apr. 21, 2022.
Office Action for CA Application No. 3,038,285 dated May 12, 2022.
Notification of Second Office Action for CN Application No. 2019103416596 dated Jul. 19, 2022.

* cited by examiner

MULTI-COMPONENT MELT ELECTROMAGNETIC EFFECT PROTECTION CAP SYSTEM

FIELD

This disclosure relates to an electromagnetic effect ("EME") protection cap and more particularly to an EME protection cap which encloses an end portion of a fastener with securement of the protection cap to a structure through which the end portion of the fastener extends.

BACKGROUND

EME protection caps are installed to enclose end portions of fasteners which extend from a structure. The enclosed end portions of the fastener isolates the end portion of the fastener from an environment the end portion of the fastener would otherwise extend into with extending from the structure. Depending on a location of the structure, the environment in which the end portion of the fastener may otherwise extend into may include volatile vapor, volatile liquid or sensitive equipment. Securing the protection cap over the end portion of the fastener and enclosing the end portion of the fastener with the protection cap secured to the structure is beneficial in preventing a spark from emanating from the end portion of the fastener and interacting with the environment in which the end portion of the fastener would otherwise extend into should a lightning strike event or other electromagnetic event occur. The enclosing of the end portion of the fastener prevents sparks interacting with volatile vapor, liquid or sensitive equipment positioned in the area of the end portion of the fastener extending from the structure.

Protection caps are constructed of various materials such as thermoset, thermoplastic, epoxy or other commonly used materials employed in protection cap construction. Installation of the protection caps includes use of a sealant that adheres the protection cap to the structure and seals the protection cap to the structure about the end portion of the fastener electrically isolating the end portion of the fastener from the environment positioned outside the protection cap. The use of sealant is time consuming and can lead to occurrences of a defective installation of the protection cap, which would result in the reinstallation of the protection cap. A defective installation of the protection cap when using sealant can occur as a result of lift off of the protection cap from the structure due to the sealant decompressing. Other defective installations can occur as a result of movement of the protection cap as a result of gravitational forces exerted on the protection cap before the protection cap is fully seated in position on the structure.

Defective installations are reinstalled and result in additional cost in original fabrication of a structure being fabricated, such as for example an aircraft, or at time of maintenance of the structure. In either original fabrication or in maintenance involving sealant, time is consumed with respect to curing of the sealant. In addition, extra labor and cost is experienced with maintenance of the structure such as an aircraft where replacement of a protection cap also requires residual sealant being removed before installation of the replacement protection cap can occur. As a result, it would be beneficial to be able to secure a protection cap to a structure and enclose the end portion of a fastener without using sealant for the securement of the protection cap to the structure.

Since, for example structures such as an aircraft often contain numerous protection caps, improvement on time of installation and improvement on rate of quality installations, can provide value with the installation of the protection caps at the time of fabrication of an aircraft. Improvement on time related to installation of protection caps would be further enhanced should the protection caps be able to be installed without expending the labor to apply a sealant and the time expended for the sealant to cure. Similarly, improvement of time of installation and rate of quality of installations can provide value at the time of replacement of protection caps during maintenance of structures such as aircraft.

In the occurrence of installing a protection cap, which for example, is constructed with a polysulfide sealant to secure the protection cap to a thermoplastic structure, such as within a fuel tank of an aircraft, an adhesion promoter would need to be used to achieve the necessary adhesion. An adhesion promoter can be a potentially hazardous chemical. As a result, it would be beneficial to have a protection cap that could be positioned and secured in a desired position on the structure without use of a sealant or adhesion promoter.

The features, functions, and advantages that have been discussed can be achieved independently in various embodiments or may be combined in yet other embodiments further details of which can be seen with reference to the following description and drawings.

SUMMARY

An example includes a protection cap assembly for enclosing an end portion of a fastener which extends through a structure of an aircraft which includes a cap member having a sidewall. The sidewall defines an opening and an interior space wherein the opening is aligned with the interior space for receiving the end portion of the fastener through the opening and into the interior space and an end surface for abutting the structure. The protection cap assembly further includes a projection member secured to and extends from the end surface of the sidewall of the cap member.

An example includes a protection cap system for enclosing an end portion of a fastener which extends through a structure of an aircraft which includes a cap member having a sidewall. The sidewall defines an opening and an interior space wherein the opening is aligned with the interior space for receiving the end portion of the fastener through the opening and into the interior space and an end surface for abutting the structure. The protection cap system further includes a projection member, separate from the cap member, wherein the projection member is constructed of a thermoplastic material and with the projection member positioned within an opening defined in the structure, the end surface is positioned in overlying relationship to the projection member.

An example includes a method for installing a protection cap assembly for enclosing an end portion of a fastener which extends through a structure of an aircraft which includes a step of positioning a protection cap assembly onto the structure enclosing the end portion of the fastener, wherein the protection cap assembly includes a cap member having a sidewall, which defines an opening and an interior space wherein the opening is aligned with the interior space for receiving the end portion of the fastener through the opening and into the interior space with positioning the protection cap assembly and an end surface which abuts the structure with positioning the protection cap assembly. The protection cap assembly includes a projection member, constructed of a thermoplastic material, which is secured to and extends from the end surface of the cap member such that the projection member enters into an opening defined by the structure with positioning of the protection cap assembly. The method further includes applying one of heat or ultrasound to the thermoplastic material of the projection member melting the thermoplastic material. The method also includes cooling of the thermoplastic material of the projection member such that the thermoplastic material of the projection member solidifies and adheres to the cap member and the structure securing the cap member to the structure.

An example includes a method for installing a protection cap system for enclosing an end portion of a fastener which extends through a structure of an aircraft which includes a step of positioning a projection member of the protection cap system, constructed of a thermoplastic material, into an opening defined in the structure. The method includes a step of positioning a cap member of the protection cap system, which is separate from the projection member, onto the structure wherein the cap member has a sidewall which defines an opening and an interior space, wherein the opening is aligned with the interior space, such that the end portion of the fastener extends through the opening and into the interior space with positioning of the cap member onto the structure. The sidewall defines an end surface which abuts the structure such that the end surface overlies the projection member with positioning of the cap member onto the structure. The method further includes a step of applying one of heat or ultrasound to the thermoplastic material of the projection member melting the thermoplastic material and further includes a step of cooling of the thermoplastic material of the projection member such that the thermoplastic material of the projection member solidifies and adheres to the end surface of the cap member and to the structure securing the cap member to the structure.

An example includes a method for installing a protection cap for enclosing an end portion of a fastener which extends through a structure of an aircraft which includes a step of positioning the protection cap onto the structure wherein the protection cap has a sidewall which defines an opening and an interior space wherein the opening is aligned with the interior space such that the end portion of the fastener extends through the opening and into the interior space with positioning the protection cap onto the structure and an end portion of the sidewall of the cap member constructed of a thermoplastic material which includes an end surface which abuts the structure with positioning the protection cap on the structure. The method further includes a step of applying one of heat or ultrasound to the end portion of the sidewall of the cap member and melting the thermoplastic material of the end portion and includes a step of cooling the end portion of the sidewall of the cap member such that the thermoplastic material of the end portion of the sidewall solidifies and adheres to the structure and to a remaining portion of the sidewall of the cap member securing the cap member to the structure.

DESCRIPTION

Figure 1:
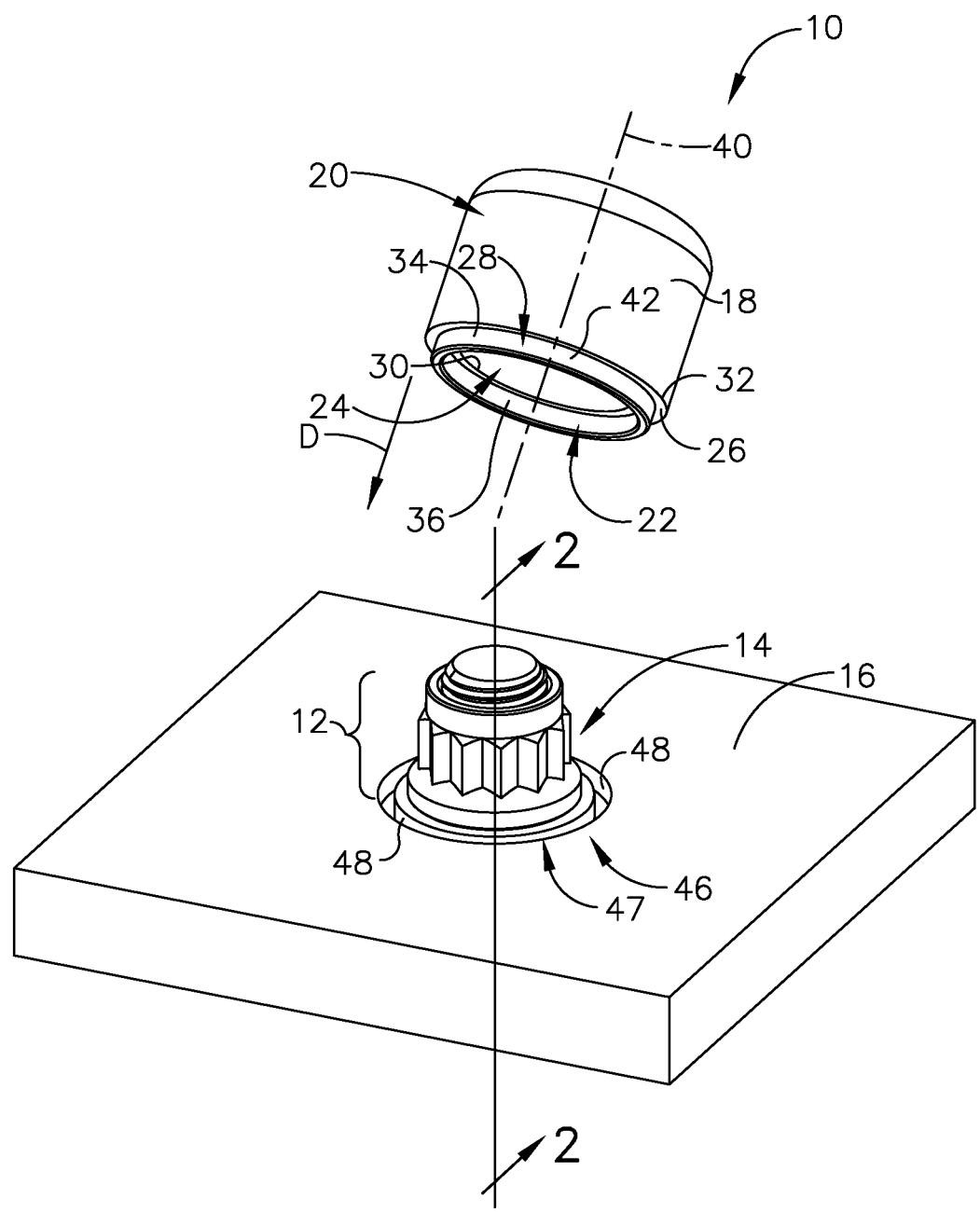
FIG. 1 is an exploded perspective view of a first example of a protection cap assembly in a tilted position relative to an installation alignment of the protection cap assembly with an end portion of a fastener extending through a structure.
Figure 2:
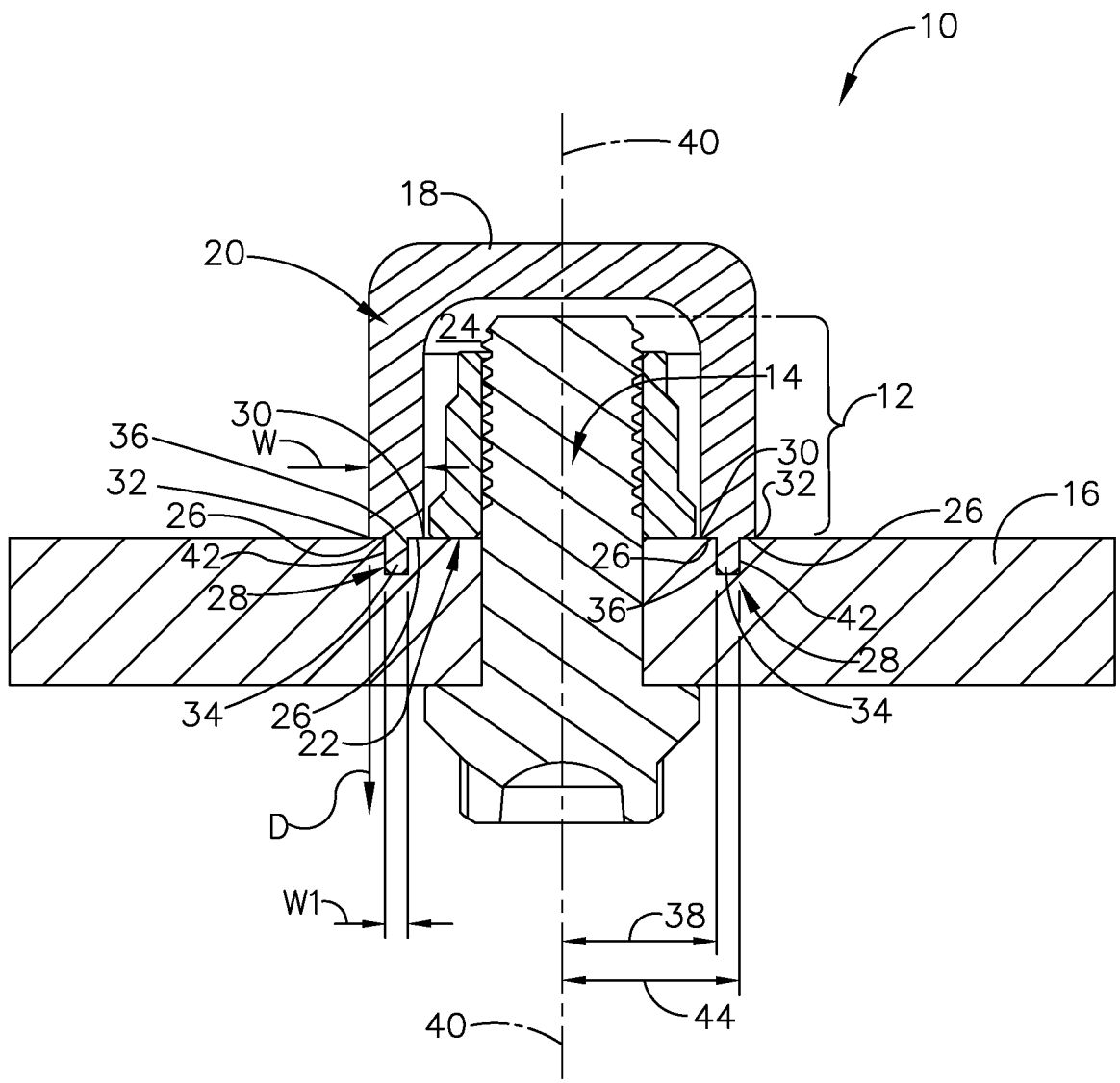
FIG. 2 is a cross section view along line 2-2 of FIG. 1 of the first example of the protection cap assembly positioned on the structure and enclosing the end portion of the fastener extending through the structure.

In referring to FIGS. 1-4, a first example of protection cap assembly 10 and a second example of protection cap assembly 10' are shown, which are utilized for enclosing an end portion 12 of fastener 14 which extends through structure 16 of, in this example an aircraft. First example of protection cap assembly 10 is seen in FIGS. 1 and 2 includes cap member 18 having a sidewall 20 which defines opening 22 and interior space 24 wherein opening 22 is aligned with interior space 24 for receiving end portion 12 of fastener 14 through opening 22 and into interior space 24. Sidewall 20 further defines end surface 26 for abutting structure 16. Protection cap assembly 10 further includes projection member 28 secured to and extends from end surface 26 of sidewall 20 of cap member 18.

Cap member 18 is constructed from one or more materials which include thermoset, thermoplastic, epoxy resin and other materials used in construction of cap members used to enclose an end portion of a fastener to provide protection from an EME event. Cap member 18 can also be constructed by one of a variety of methodologies such as utilizing injection molding techniques, three dimensional printing techniques as well as other fabrication techniques. With respect to the first example of protection cap assembly 10, the construction of projection member 28 will be that of a thermoplastic material. The thermoplastic material selected for construction of projection member 28 will desirably have a melting temperature that is lower than the melting temperature of the material which used in constructing cap member 18. The lower melting temperature of the thermoplastic material, which constructs projection member 28, than the melting temperature for the material which constructs cap member 18 provides for selective melting of projection member 28 without melting cap member 18. With selectively melting thermoplastic material of projection member 28 in contact with cap member 18 and structure 16, subsequent cooling of the melted thermoplastic material results in the thermoplastic material solidifying and adhering to cap member 18 and structure 16 securing cap member 18 to structure 16, without melting cap member 18 in the securement process.

End surface 26 of sidewall 20 has width dimension W which extends from inside edge 30 of sidewall 20, which defines opening 22, to outside edge 32 of sidewall 20. Projection member 28 is positioned, in this example, between inside edge 30 and outside edge 32 of end surface 26. Projection member 28, in this example, extends in a direction D transverse from end surface 26. Projection member 28 includes wall member 34, which has inner wall surface 36 which is first radial distance 38 from central axis 40 of cap member 18 and outer wall surface 42 is second radial distance 44 from central axis 40, wherein second radial distance 44 is greater than first radial distance 38.

Wall member 34 extends annularly about central axis 40 of cap member 18, as seen in FIG. 1. Width dimension W1 of wall member 34 between inner wall surface 36 and outer wall surface 42 is a predetermined dimension to create an interference fit with positioning wall member 34 in opening 46 defined in structure 16, as seen in FIG. 1, wherein both wall member 34 and opening 46 each have, in this example, an annular configuration. Opening 46 is in this example channel 47 positioned to extend about end portion 12 of fastener 14 and is configured to be of a dimension to establish friction between wall member 34 and sidewalls 48 of opening 46 or channel 47, with insertion of wall member 34 into opening 46, creating an interference fit of wall member 34 with sidewalls 48 of opening 46 or channel 47. The interference fit of wall member 34 and sidewalls 48 of opening 46 or channel 47 provides convenience to the installer to position cap member 18 with respect to structure 16 with cap member 18 held in position, regardless of the orientation of cap member 18 such that installer can further secure cap member 18 to structure 16 with melting of projection member 28, as will be described further below. The melting of projection member 28 and implementing the melting securement process can be accomplished without the installer having to hold cap member 18 against structure 16.

Cap member 18 is held in a desired position with the interference fit between wall member 34 and sidewalls 48 of opening 46 with respect to structure 16 for further securement of cap member 18 to structure 16, regardless of the orientation of cap member 18. Such orientations can include for example, structure 16 being positioned overhead and cap member 18 is positioned in an upside down position, structure 16 being positioned to extend vertically and cap member is positioned to extend outwardly from structure 16, or structure 16 is positioned on an incline relative to horizontal. With cap member 18 positioned in any of these various orientations, the force of gravity is prevented from moving cap member 18 from a desired position with the interference fit between wall member 34 and sidewalls 48 of opening 46 or in this example channel 47. The interference fit holds cap member 18 in a desired position for subsequent securement of cap member 18 to structure 16 with melting of and thereafter cooling of the thermoplastic material of projection members 28. With the cooling of the thermoplastic material of the projection members 28, the thermoplastic material adheres to structure 16 and cap member 18 and with solidification of the thermoplastic material, the solidified thermoplastic material secures cap member 18 to structure 16. The interference fit of wall member 34 with sidewalls 48 of opening 46, or in this example channel 47, facilitates easier installation of protection cap assembly 10 and alleviates any inconvenience to the installer of having to hold cap member 18 in position in implementing further securement of cap member 18 to structure 16.

Figure 3:
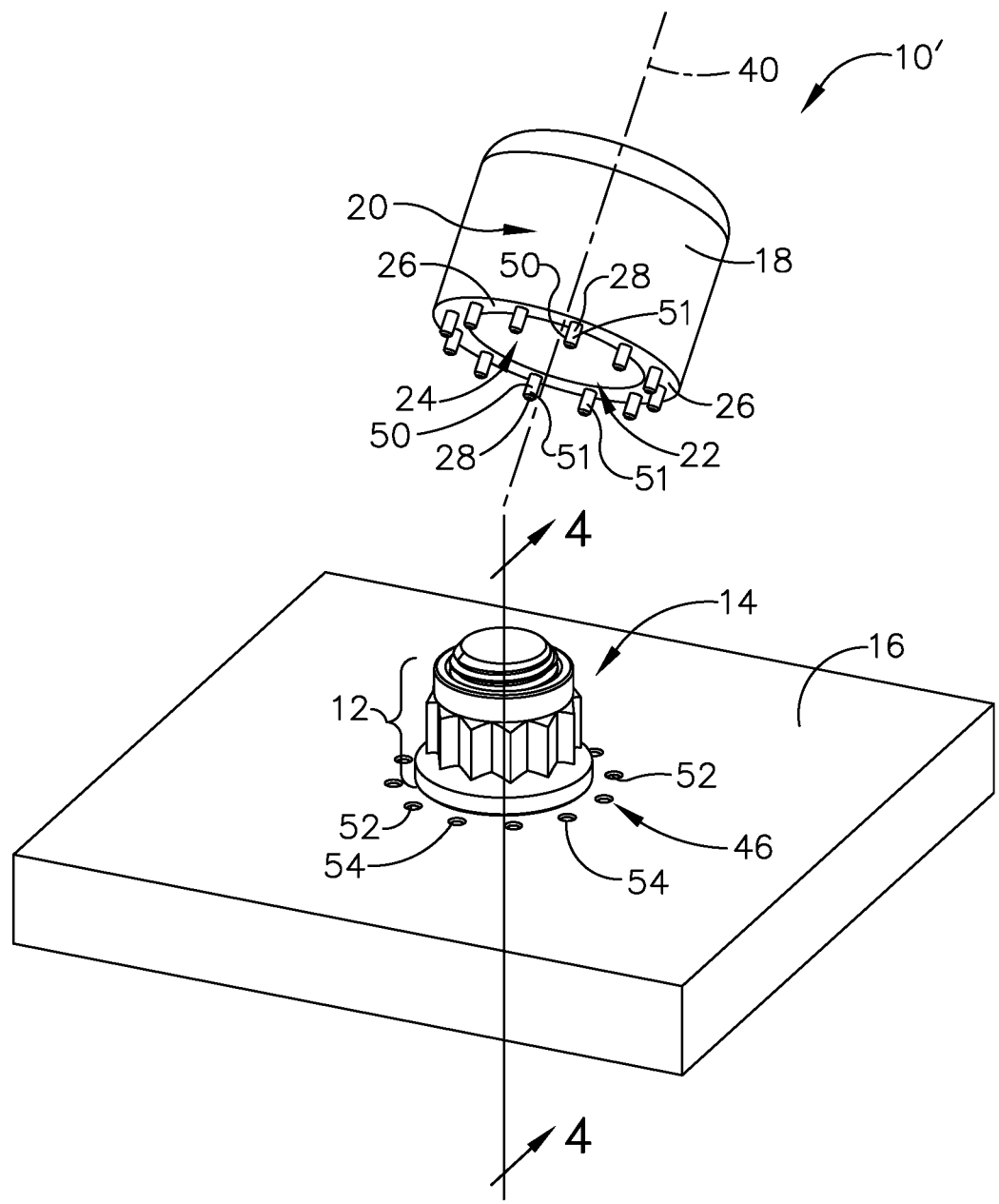
FIG. 3 is an exploded perspective view of a second example of a protection cap assembly in a tilted position relative to an installation alignment of the protection cap assembly with an end portion of a fastener extending through a structure.
Figure 4:
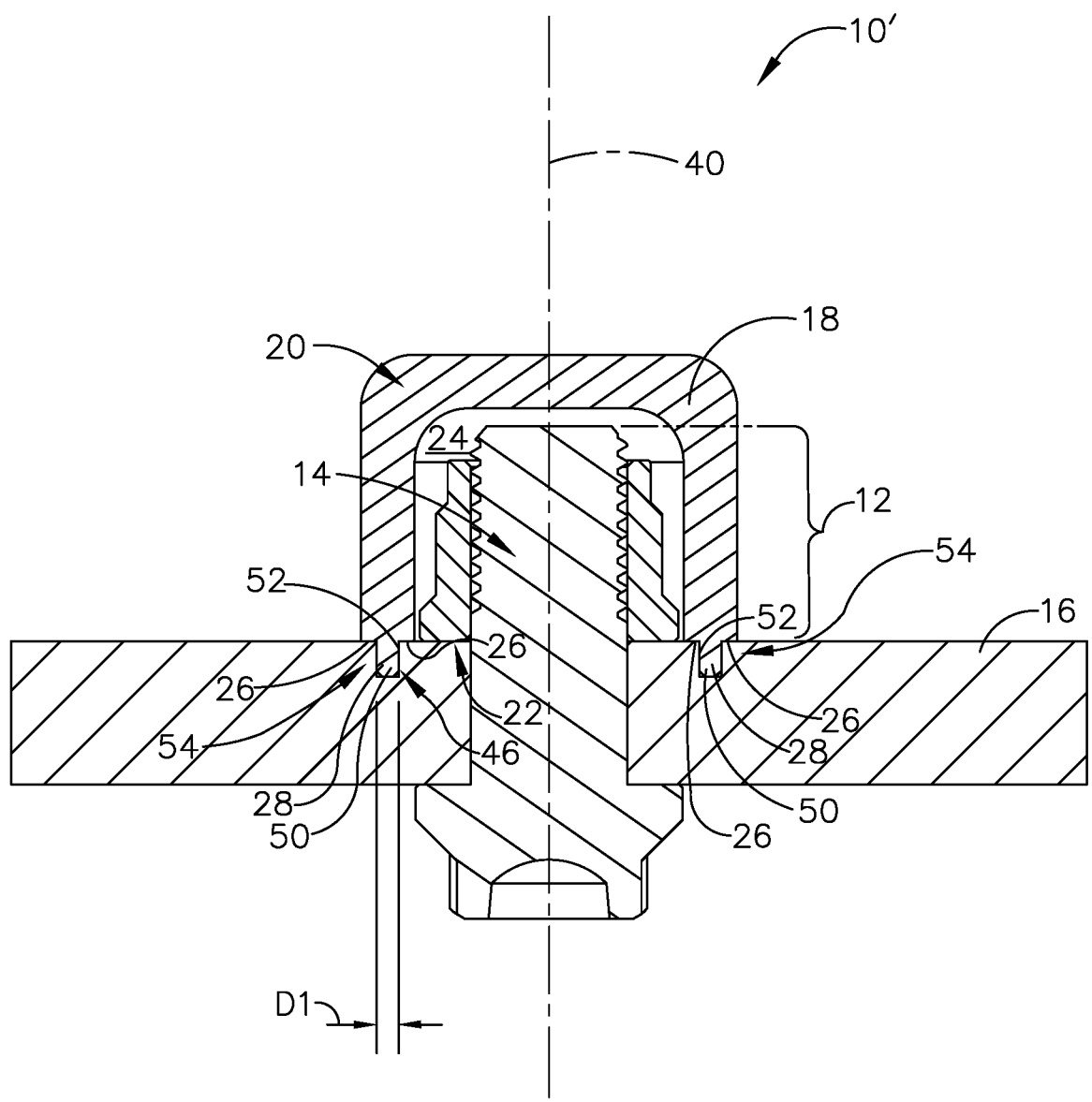
FIG. 4 is a cross section view along line 4-4 of FIG. 3 of the second example of the protection cap assembly positioned on the structure and enclosing the end portion of the fastener extending through the structure.

Second example of protection cap assembly 10' is seen in FIGS. 3 and 4. In the second example, projection member 28 includes post member 50 positioned extending from end surface 26 of sidewall 20. In this example, a plurality of post members 50 are positioned spaced apart from one another positioned about central axis 40 of cap member 18. Post member 50 defines a predetermined diameter D1 and the post member 50 forms a circumferential surface 51 about post member 50 which creates an interference fit with sidewall 52 of opening 46, or as in this example hole 54, defined in structure 16 with positioning post member 50 in hole 54.

In this example, a plurality of post members 50 are each positioned into a corresponding hole 54 defined in structure 16. With circumferential surface 51 of post member 50 creating an interference fit with sidewall 52 of hole 54, cap member 18 is held in a desired position relative to structure 16 and removes any inconvenience to the installer of having to hold cap member 18 in position regardless of the orientation of cap member 18, as mentioned earlier, so as to further secure cap member 18 to structure 16. Further securement of cap member 18 includes the installer melting the thermoplastic material of post member 50 construction. The subsequent cooling of the thermoplastic material, which is in contact with structure 16 and cap member 18, results in the thermoplastic material adhering to the structure and cap member 18 and solidification of the thermoplastic material securing cap member 18 to structure 16.

As described above, the thermoplastic material selected for the construction of projection member 28, for this example post member 50, will desirably have a melting temperature which is lower than the melting temperature of the material of which cap member 18 is constructed. The lower melting temperature of the thermoplastic material of post member 50 than the melting temperature for the material of which cap member 18 is constructed provides for selective melting of post member 50, for securing cap member 18 to structure 16, without melting cap member 18 in the securement process.

Figure 5:
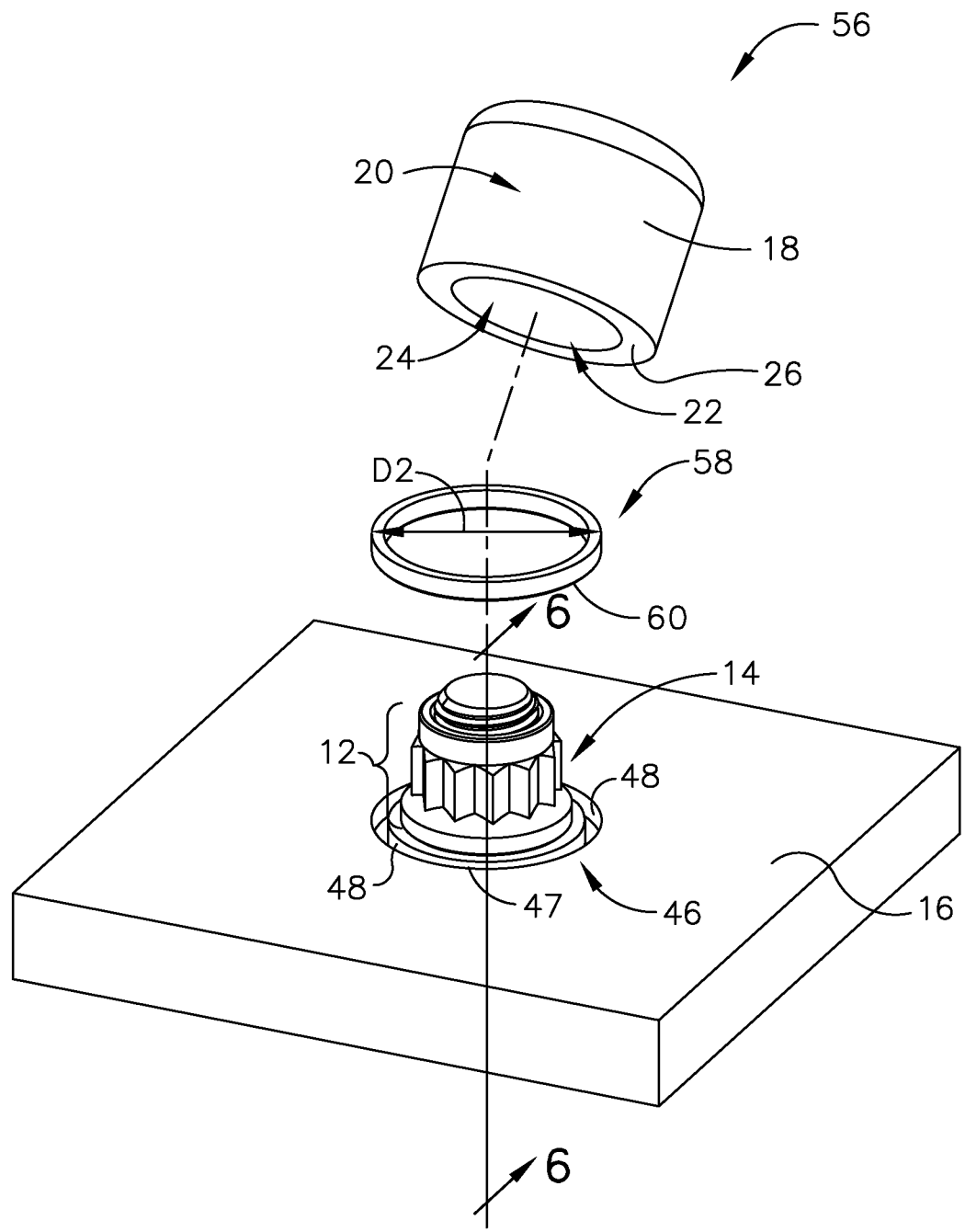
FIG. 5 is an exploded perspective view of first example of a protection cap system with a protection cap in a tilted position relative to an installation alignment of the protection cap assembly with an end portion of a fastener extending through a structure.
Figure 6:
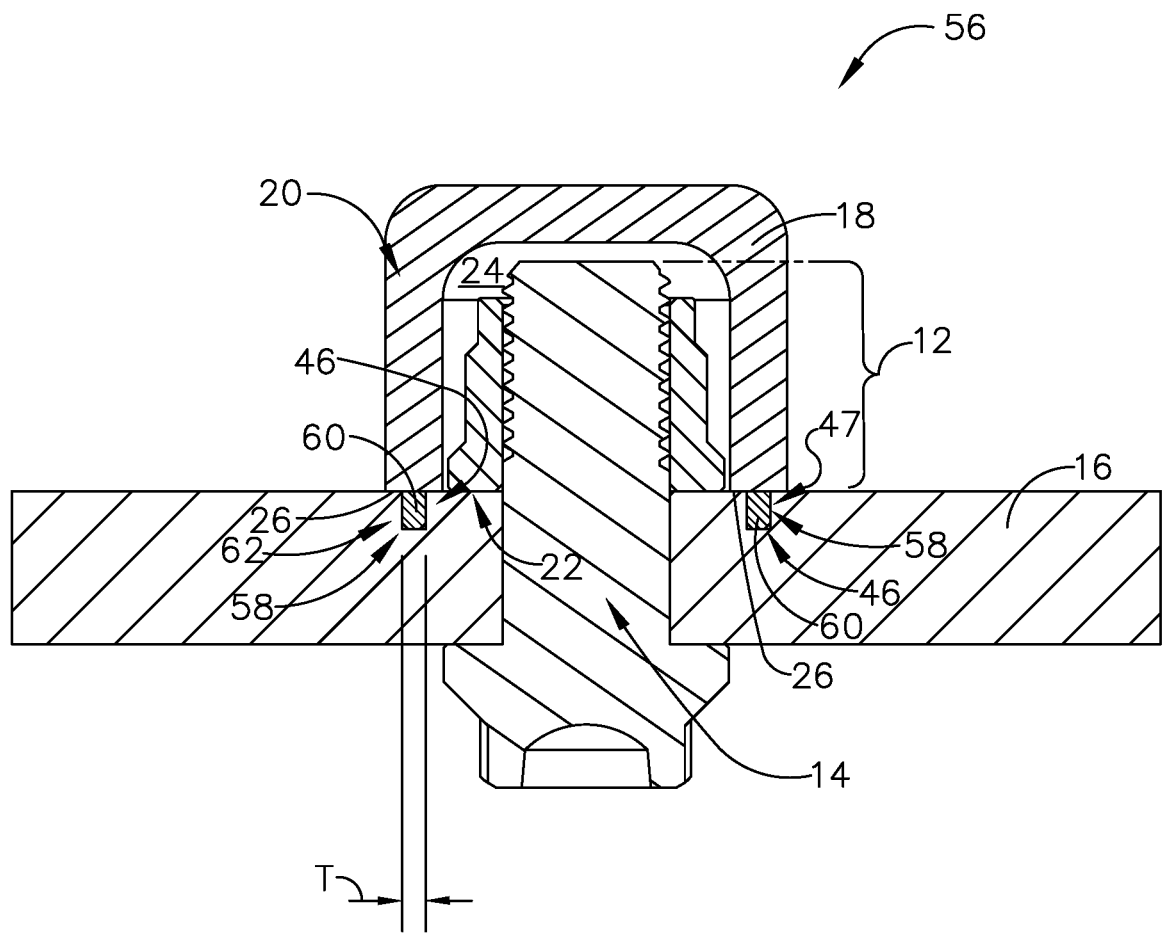
FIG. 6 is a cross section view along line 6-6 of FIG. 5 of the first example of the protection cap system positioned on the structure and enclosing the end portion of the fastener extending through the structure.

In referring to FIGS. 5-8, a first example of protection cap system 56 and a second example of protection cap system 56' are shown, which are utilized for enclosing an end portion 12 of fastener 14 which extends through structure 16, in this example, of an aircraft. First example of protection cap system 56 is seen in FIGS. 5 and 6 and includes cap member 18 having a sidewall 20 which defines opening 22 and interior space 24 wherein opening 22 is aligned with interior space 24 for receiving end portion 12 of fastener 14 through opening 22 and into interior space 24. Sidewall 20 further defines end surface 26 for abutting structure 16. Protection cap system 56 further includes projection member 58, which is separate from cap member 18, wherein projection member 58 is constructed of thermoplastic material. With projection member 58 positioned within opening 46 defined in structure 16, end surface 26 is positioned in overlying relationship to projection member 58 and structure 16.

In referring to FIGS. 5 and 6 projection member 58 includes wall member 60 configured in an annular configuration and having a predetermined wall thickness dimension T, which creates an interference fit with positioning wall member 60 in opening 46, which in this example is channel 47, defined in structure 16 with wall member 60 contacting sidewalls 48 of opening 46 or channel 47. Opening 46 or channel 47 and wall member 60 each have an annular configuration. Wall member 60 has diameter D2 such that end surface 26 of sidewall 20 overlies wall member 60 with end surface 26 of sidewall 20 positioned on structure 16.

First example of protection cap system 56 is employed with installer inserting wall member 60 into opening 46, or in this example channel 47, with an interference fit between wall member 60 and sidewalls 48 of opening 46 or channel 47 holding wall member 60 in position within opening 46 or channel 47. End surface 26 of sidewall 20 of cap member 18 is positioned overlying structure 16 and wall member 60 with wall member 60 positioned in opening 46 or channel 47, as seen in FIG. 6. With cap member 18 in position overlying wall member 60, the thermoplastic material of wall member 60 is melted utilizing heat or ultrasound. The melted thermoplastic material of wall member 60 in contact with structure 16 and end surface 26 of sidewall 20 of cap member 18 subsequently cools and solidifies adhering to both structure 16 and end surface 26 securing cap member 18 and structure 16 together. As discussed earlier, selecting a thermoplastic material for wall member 60, which has a lower melting temperature than material from which cap member 18 is constructed, the thermoplastic material of wall member 60 which is melted to attain securement of cap member 18 and structure 16 can be accomplished without causing melting of material of cap member 18.

Figure 7:
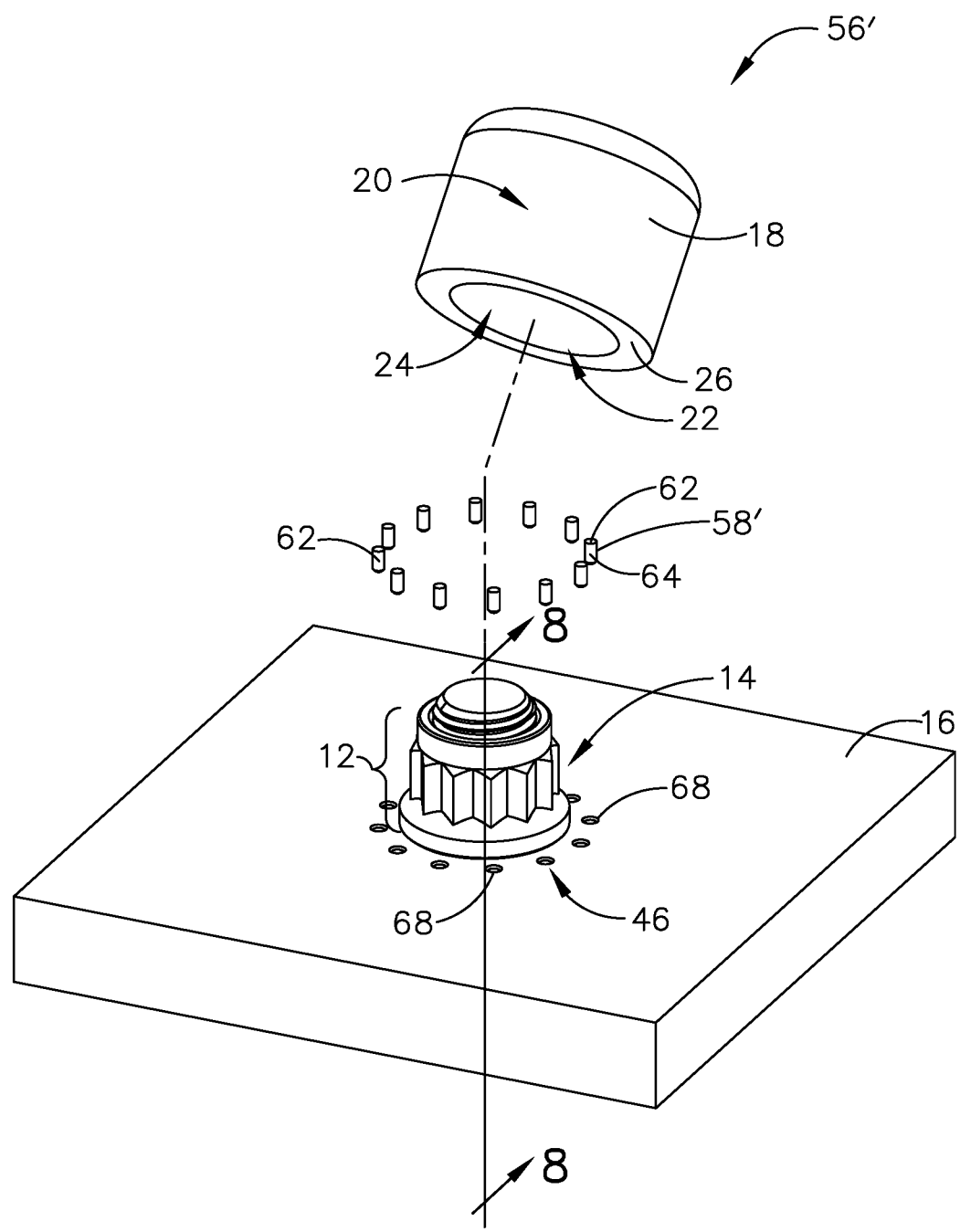
FIG. 7 is an exploded perspective view of a second example of a protection cap system with a protection cap in a tilted position relative to an installation alignment of the protection cap assembly with an end portion of a fastener extending through a structure.
Figure 8:
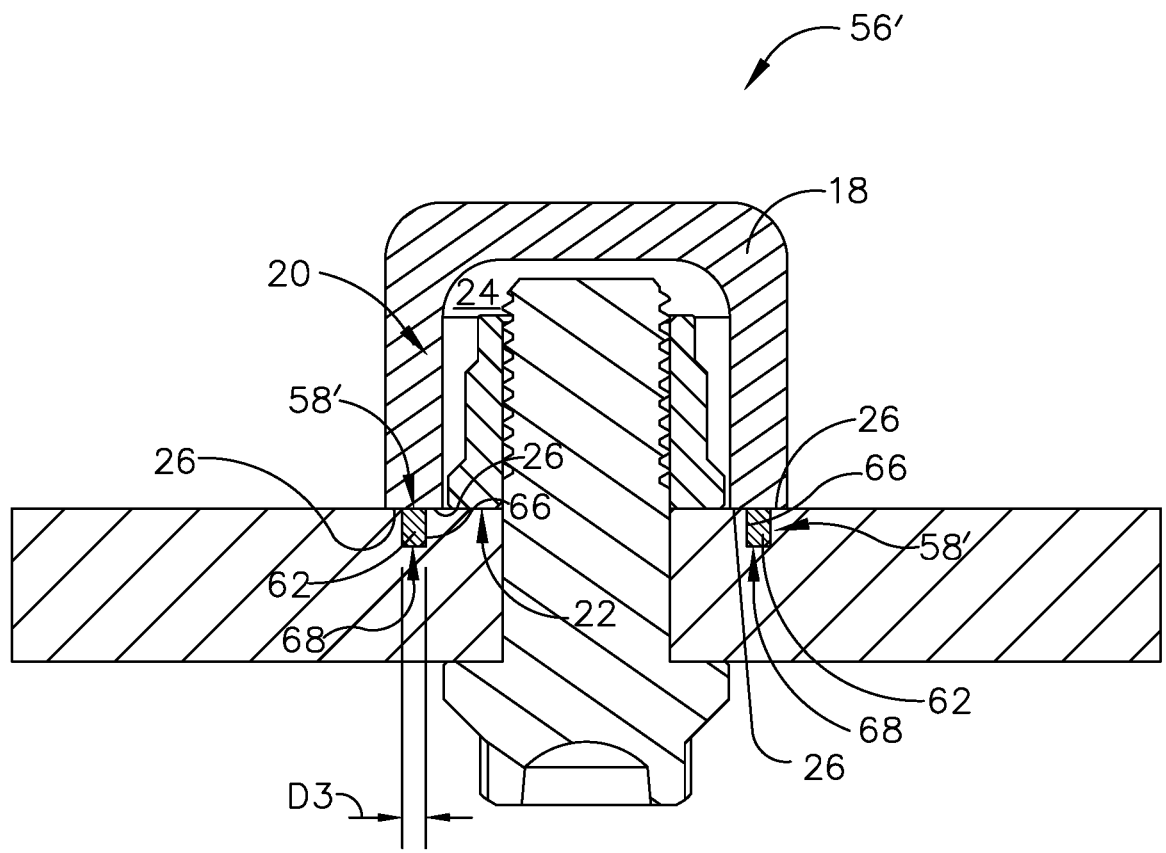
FIG. 8 is a cross section view along line 8-8 of FIG. 7 of the second example of the protection cap system positioned on the structure and enclosing the end portion of the fastener extending through the structure.

In referring to FIGS. 7 and 8, second example of protection cap system 56' is shown which includes cap member 18 having a sidewall 20 which defines opening 22 and interior space 24 wherein opening 22 is aligned with interior space 24 for receiving end portion 12 of fastener 14 through opening 22 and into interior space 24. Sidewall 20 further defines end surface 26 for abutting structure 16. Protection cap system 56' further includes projection member 58', which is separate from cap member 18, wherein projection member 58' is constructed of thermoplastic material. With projection member 58' positioned within opening 46 defined in structure 16, end surface 26 is positioned in overlying relationship to projection member 58' and structure 16.

In referring to FIGS. 7 and 8 projection member 58' includes post member 62 which defines a predetermined diameter D3 and post member 62 forms a circumferential surface 64 about post member 62 which creates an interference fit with sidewall 66 of opening 46 comprising hole 68 defined in the structure 16 with positioning post member 62 in hole 68. In this example, plurality of post members 62 are employed and are positioned within plurality of holes 68. Plurality of holes 68 are defined by structure 16 and are positioned spaced apart from one another such that cap member 18 overlies plurality of post members 62 with cap member 18 positioned on structure 16.

Second example of protection cap assembly 56' as seen in FIGS. 7 and 8 is employed with installer inserting post members 62 into holes 68 such that a post member 62, in this example is positioned into each hole 68. Each post member 62 has an interference fit with the corresponding hole 68 into which post member 62 is inserted. The interference fit holds post members 62 in position within each hole 68. End surface 26 of sidewall 20 of cap member 18 is positioned overlying structure 16 and post members 62, as seen in FIGS. 7 and 8. With cap member 18 positioned overlying post members 62, the thermoplastic material of post member 62 is melted utilizing heat or ultrasound. The melted thermoplastic material of post member 62 in contact with structure 16 and end surface 26 of sidewall 20 of cap member 18 subsequently cools and solidifies adhering to both structure 16 and end surface 26 securing cap member 18 and structure 16 together. As discussed earlier, selecting a thermoplastic material for post member 62, which has a lower melting temperature than material from which cap member 18 is constructed is desirable, the thermoplastic material of post member 62 which is melted to attain securement together of cap member 18 and structure 16 can be accomplished without causing melting of material of cap member 18.

Figure 9:
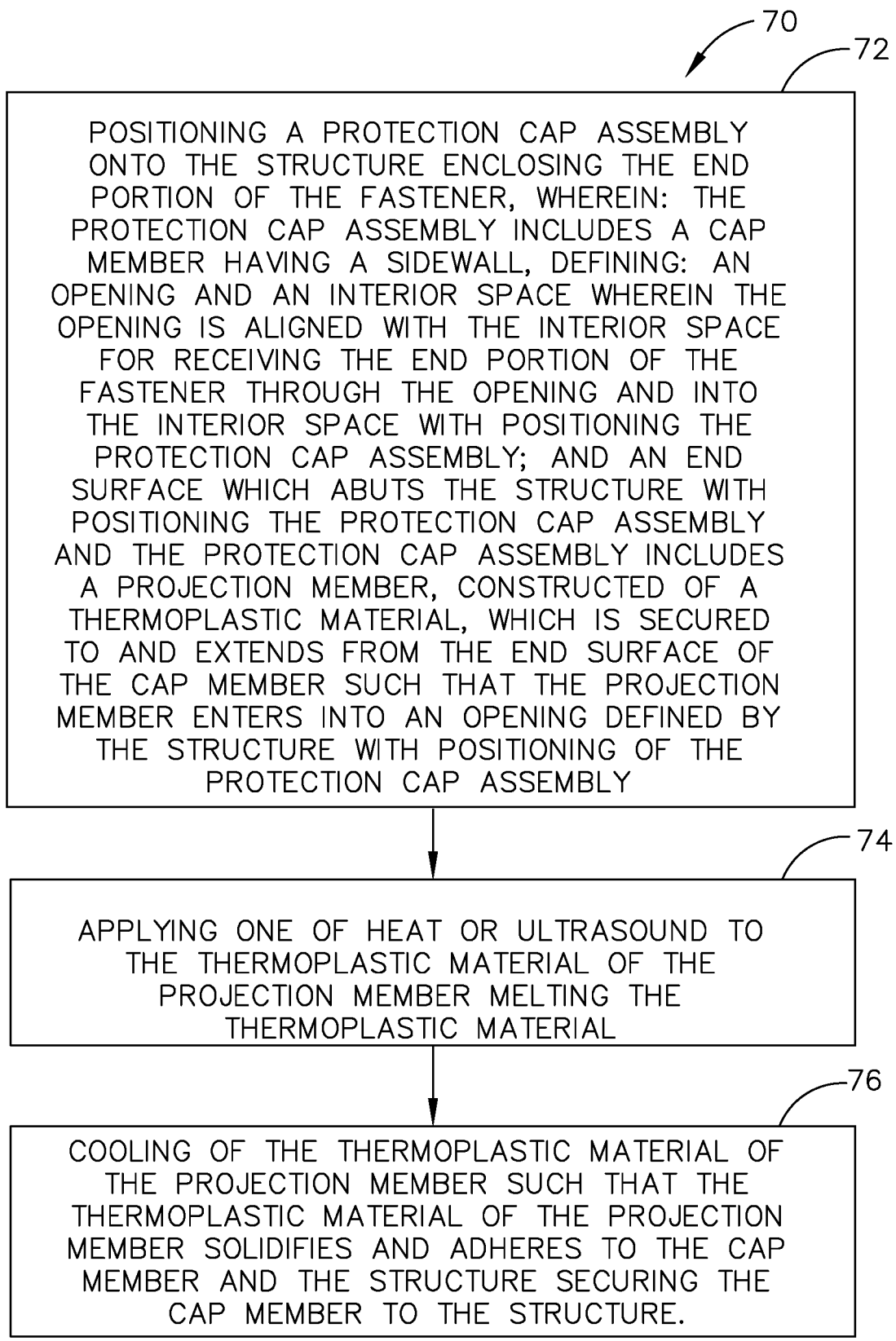
FIG. 9 is a flow chart of a method for installing a protection cap assembly for enclosing an end portion of a fastener which extends through a structure.

In referring to FIG. 9, method 70 for installing protection cap assembly 10, 10' for enclosing an end portion 12 of a fastener 14 which extends through a structure 16 of an aircraft, includes step 72 of positioning a protection cap assembly 10, 10', as seen in FIGS. 1-4, onto structure 16 enclosing end portion 12 of fastener 14. Protection cap assembly 10, 10' includes cap member 18 having sidewall 20 which defines an opening 22 and interior space 24 wherein opening 22 is aligned with interior space 24 for receiving end portion 12 of fastener 14 through opening 22 and into interior space 24 with positioning protection cap assembly 10, 10'. End surface 26 abuts structure 16 with positioning protection cap assembly 10, 10' and cap member 18 includes projection member 28, constructed of a thermoplastic material, which is secured to and extends from end surface 26 of cap member 18 such that projection member 28 enters into an opening 46 defined by structure 16 with positioning of protection cap assembly 10, 10'. Method 70 further includes step 74 of applying one of heat or ultrasound to the thermoplastic material of projection member 28 melting the thermoplastic material and includes step of cooling 76 of the thermoplastic material of projection member 28 such that the thermoplastic material of projection member 28 solidifies and adheres to cap member 18 and structure 16 securing cap member 18 to structure 16.

Figure 10:
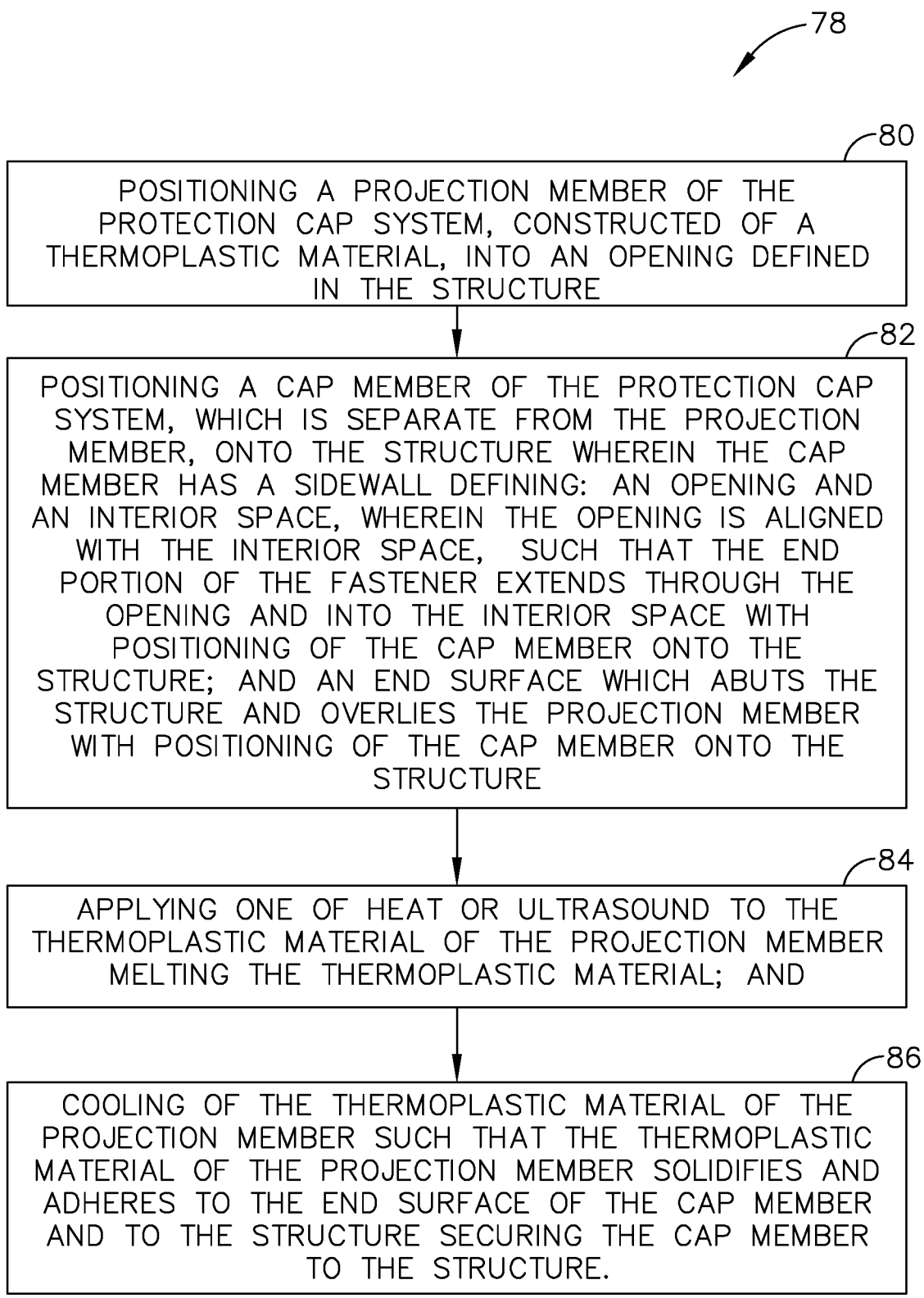
FIG. 10 is a flow chart of a method for installing a protection cap system for enclosing an end portion of a fastener which extends through a structure.

In referring to FIG. 10, method 78 for installing a protection cap system 56, 56' for enclosing an end portion 12 of fastener 14 which extends through structure 16 of an aircraft, includes step 80 of positioning projection member 58, 58' of protection cap system 56, 56', respectively, constructed of a thermoplastic material, into opening 46 defined in structure 16. Method 78 further includes step 82 of positioning cap member 18 of protection cap system 56, 56', which is separate from projection member 58, 58', onto structure 16, wherein cap member 18 has sidewall 20. Sidewall 20 defines opening 22 and interior space 24, wherein opening 22 is aligned with interior space 24, such that the end portion 12 of fastener 14 extends through opening 22 and into interior space 24 with positioning of cap member 18 onto structure 16. Sidewall 20 defines end surface 26 which abuts structure 16 such that end surface 26 overlies projection member 58, 58' with positioning of cap member 18. With cap member 18 positioned, step 84 is employed of applying one of heat or ultrasound to the thermoplastic material of projection member 58, 58' melting the thermoplastic material. Method 78 further includes step of cooling 86 of the thermoplastic material of projection member 58, 58' such that the thermoplastic material of projection member 58, 58' solidifies and adheres to the end surface 26 of cap member 18 and to structure 16 securing cap member 18 to structure 16.

Figure 11:
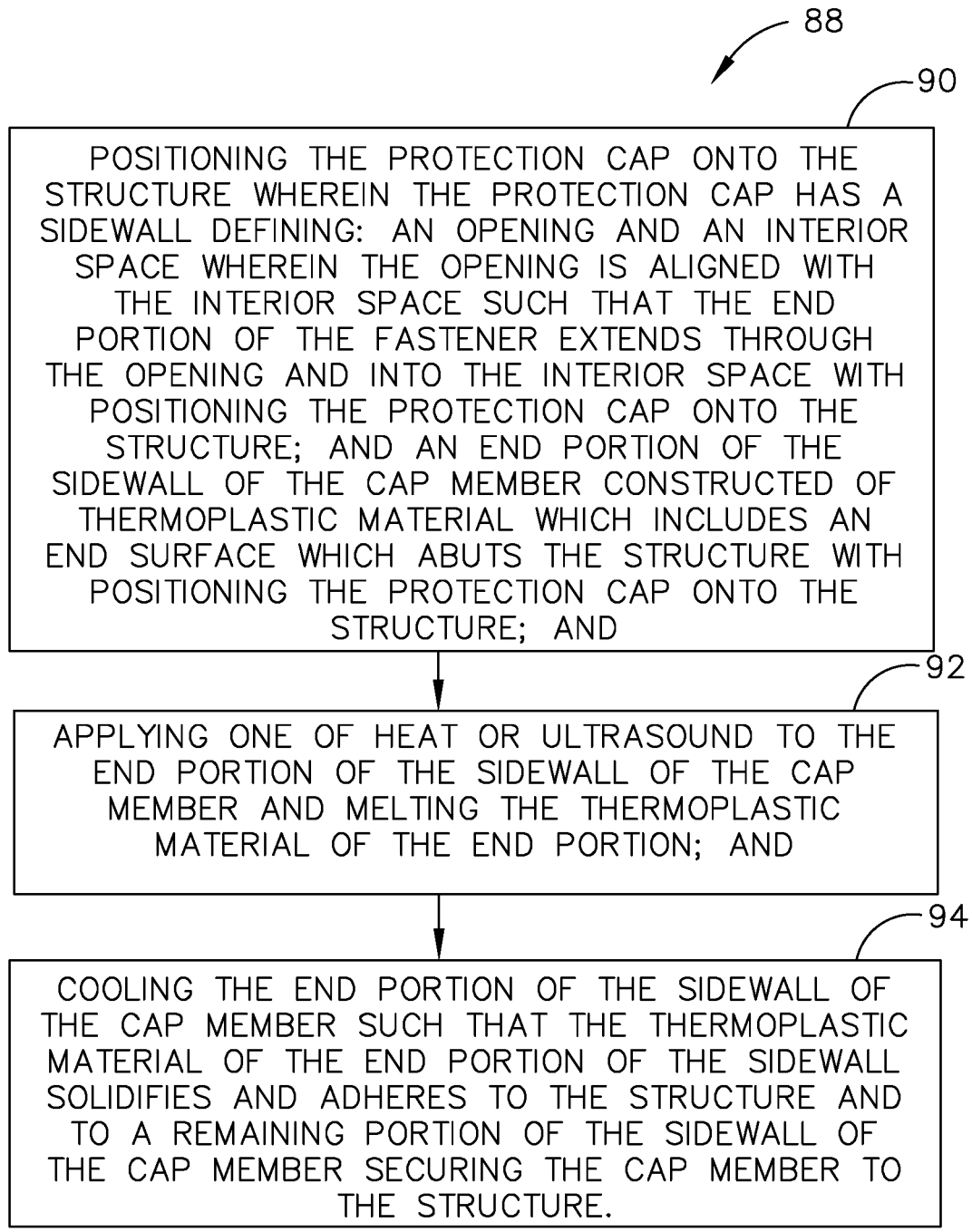
FIG. 11 is a flow chart of a method for installing a protection cap for enclosing an end portion of a fastener which extends through a structure.
Figure 12:
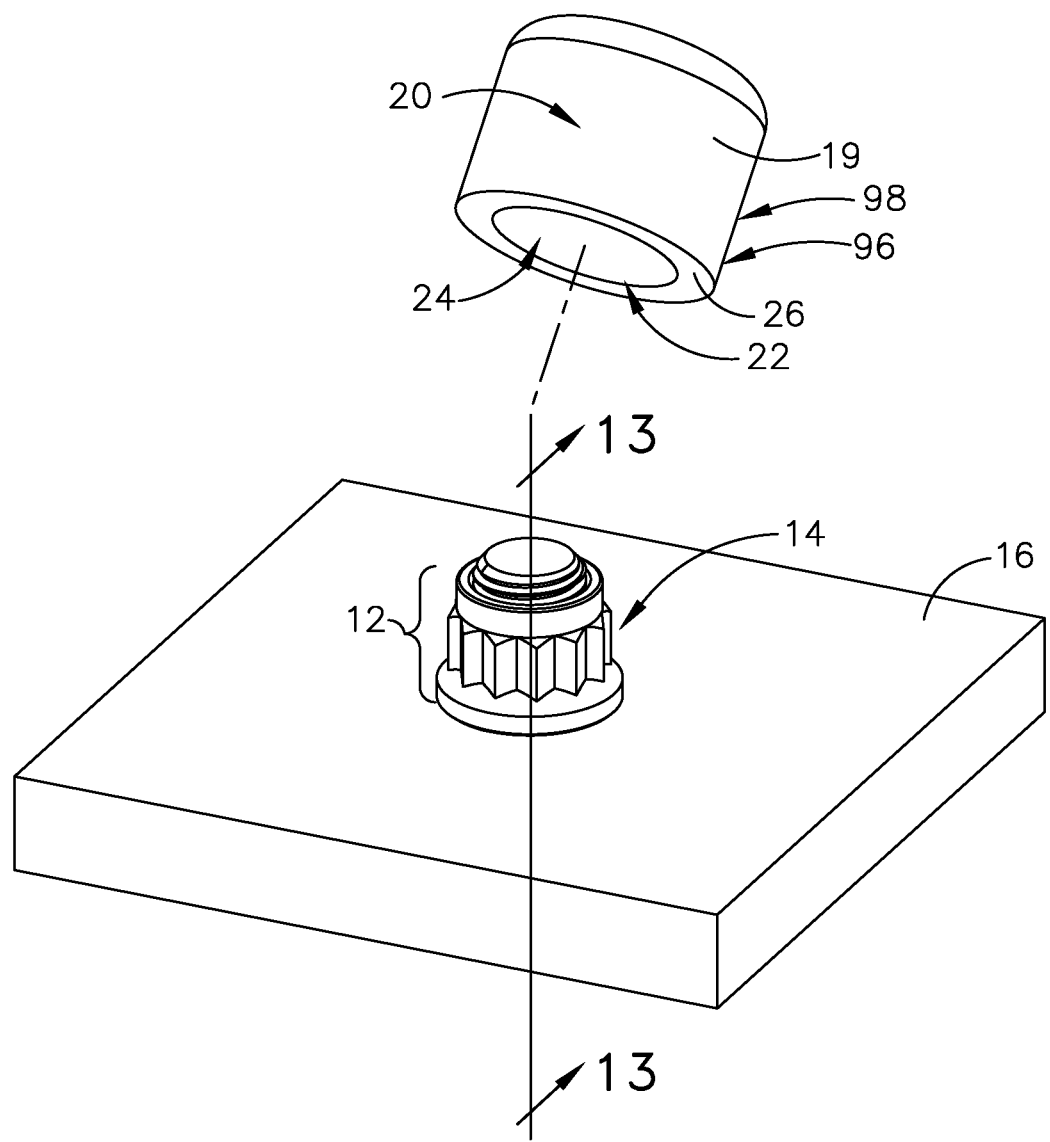
FIG. 12 is an exploded perspective view of a protection cap in a tilted position relative to an installation alignment of the protection cap with an end portion of a fastener extending through a structure.
Figure 13:
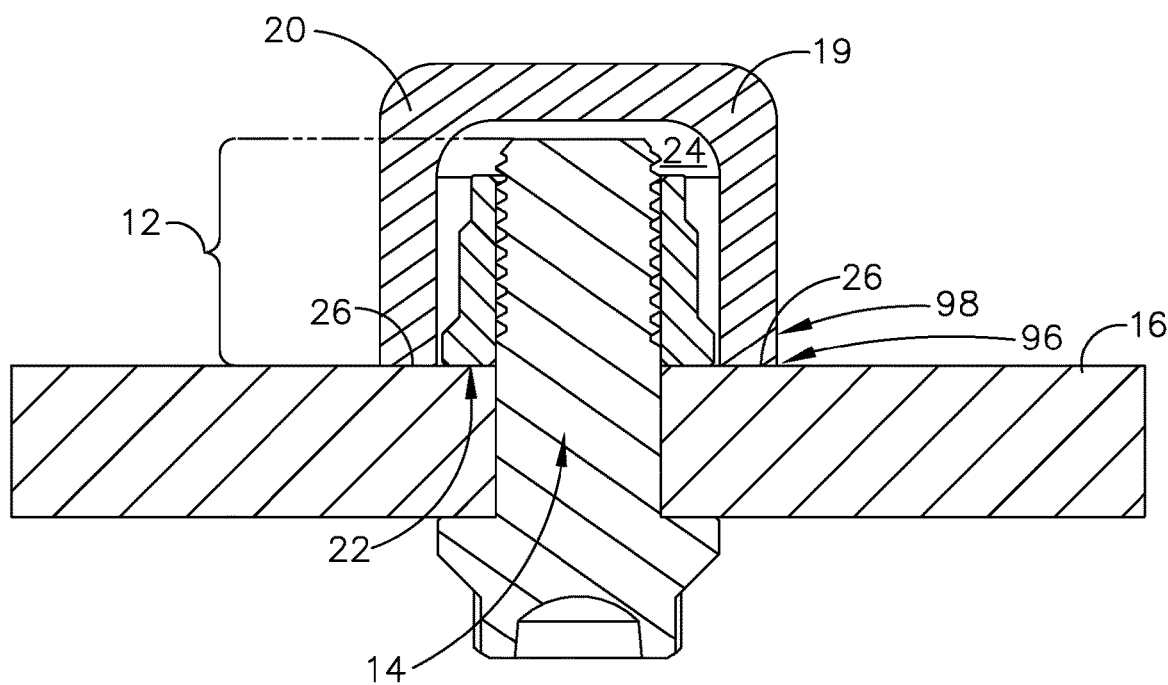
FIG. 13 is a cross section view along line 13-13 of FIG. 12 of the protection cap positioned of the structure and enclosing the end portion of the fastener extending through the structure.

In referring to FIG. 11, method 88 for installing of protection cap 19 for enclosing end portion 12 of fastener 14 which extends through structure 16 of an aircraft, is shown and corresponding employment of protection cap 19 is shown in FIGS. 12 and 13. Method 88 includes step 90 of positioning protection cap 19 onto structure 16 wherein protection cap 19 has sidewall 20 which defines opening 22 and interior space 24 wherein opening 22 is aligned with interior space 24 such that the end portion of the fastener extends through opening 22 and into interior space 24 with positioning protection cap 19 onto the structure. Sidewall 20 also defines an end portion 96 of sidewall 20 of protection cap 19 constructed of thermoplastic material which includes an end surface 26 which abuts structure 16 with positioning protection cap 19 onto structure 16. Method 88 further includes step 92 of applying one of heat or ultrasound to end portion 96 of sidewall 20 of protection cap 19 and melting the thermoplastic material of end portion 96. Method 88 further includes step of cooling 94 end portion 96 of sidewall 20 of protection cap 19 such that the thermoplastic material of end portion 96 solidifies and adheres to structure 16 and to a remaining portion 98 of sidewall 20 of protection cap 19 securing protection cap 19 to structure 16.

Should protection cap 19 be positioned in an orientation with respect to structure 16 such that a gravitational force can move protection cap 19 from its desired position on structure 16, prior to melting end portion 96 of protection cap 19 and more firmly securing protection cap 19 to structure 16, an adhesive can be applied between protection cap 19 and structure 16 to temporarily secure protection cap 19 to structure 16. With protection cap temporarily secured to structure 16, the installer can proceed to melt end portion 96 such that solidification of end portion 96 more firmly secures protection cap 19 to structure 16. Similarly, an adhesive for temporary securement of cap member 18, as earlier described, can be applied to temporarily secure cap member 18 to structure 16, as needed. This can be employed prior to melting and solidifying of the thermoplastic material of projection members such as 28, 58 or 58', as described earlier, to more firmly secure cap member 18 to structure 16.

While various embodiments have been described above, this disclosure is not intended to be limited thereto. Variations can be made to the disclosed embodiments that are still within the scope of the appended claims.

What is claimed:

1. A protection cap assembly for enclosing an end portion of a fastener which extends through a structure of an aircraft, comprising:
 a cap member having a sidewall defining:
  an opening and an interior space, wherein the opening is aligned with the interior space for receiving the end portion of the fastener through the opening and into the interior space; and
  an end surface positioned to abut the structure; and
 a projection member secured to and extends from the end surface of the sidewall of the cap member, wherein the projection member is positioned to extend within an opening of the structure, with the end surface abutting the structure.

2. The protection cap assembly of claim 1, wherein the end surface of the sidewall of the cap member has a width dimension which extends from an inside edge of the sidewall of the cap member to an outside edge of the sidewall of the cap member.

3. The protection cap assembly of claim 2, wherein the projection member is positioned between the inside edge and the outside edge of the end surface.

4. The protection cap assembly of claim 3, wherein the projection member extends in a direction transverse from the end surface.

5. The protection cap assembly of claim 1, wherein the projection member comprises a wall member, which has an inner wall surface which is a first radial distance from a central axis of the cap member and an outer wall surface is a second radial distance from the central axis, wherein the second radial distance is greater than the first radial distance.

6. The protection cap assembly of claim 5, wherein the wall member extends annularly about the central axis of the cap member.

7. The protection cap assembly of claim 5, wherein a width dimension of the wall member between the inner wall surface and the outer wall surface is a predetermined dimension to create an interference fit with positioning the wall member in the opening of the structure.

8. The protection cap assembly of claim 1, wherein the projection member comprises a post member positioned extending from the end surface of the sidewall of the cap member.

9. The protection cap assembly of claim 8, further includes a plurality of post members which are spaced apart from one another.

10. The protection cap assembly of claim 9, wherein the plurality of post members are spaced apart from one another positioned about a central axis of the cap member.

11. The protection cap assembly of claim 8, wherein the post member defines a predetermined diameter and the post member forms a circumferential surface about the post member which creates an interference fit with a sidewall of the opening of the structure when the post member is positioned in the opening of the structure.

12. The protection cap assembly of claim 1, wherein the projection member is constructed of a thermoplastic material.

13. A protection cap system for enclosing an end portion of a fastener which extends through a structure of an aircraft, comprising:
 a cap member having a sidewall defining:
  an opening and an interior space, wherein the opening is aligned with the interior space for receiving the end portion of the fastener through the opening and into the interior space; and
  an end surface for abutting the structure; and
 a projection member, separate from the cap member, wherein:
  the projection member is constructed of a thermoplastic material; and
  with the projection member positioned within an opening of the structure, the end surface is positioned in overlying relationship to the projection member.

14. The protection cap system of claim 13, wherein the opening of the structure comprises a channel defined in the structure, and wherein the projection member comprises a wall member configured in an annular configuration and having a predetermined wall thickness dimension to create an interference fit with a sidewall of the channel of the structure when the projection member is positioned in the channel of the structure.

15. The protection cap system of claim 14, wherein the wall member has a diameter such that the end surface overlies the wall member with the end surface positioned on the structure.

16. The protection cap system of claim 13, wherein the opening of the structure comprises a hole defined in the structure, and wherein the projection member comprises a post member which defines a predetermined diameter and the post member forms a circumferential surface about the post member which creates an interference fit with a sidewall of the hole of the structure when the post member is positioned in the hole of the structure.

17. The protection cap system of claim 16, further includes a plurality of post members positioned within a plurality of holes defined in the structure and positioned spaced apart from one another such that the cap member overlies the plurality of post members with the cap member positioned on the structure.

18. A method for installing a protection cap assembly for enclosing an end portion of a fastener which extends through a structure of an aircraft, comprising the steps of:
   positioning the protection cap assembly onto the structure enclosing the end portion of the fastener, wherein:
      the protection cap assembly includes a cap member having a sidewall, defining:
         an opening and an interior space, wherein the opening is aligned with the interior space for receiving the end portion of the fastener through the opening and into the interior space with positioning the protection cap assembly; and
         an end surface which abuts the structure with positioning the protection cap assembly; and
      the protection cap assembly includes a projection member, constructed of a thermoplastic material, which is secured to and extends from the end surface of the cap member such that with positioning the end surface of the cap member to abut the structure, the projection member is positioned to extend within an opening of the structure;
   applying one of heat or ultrasound to the thermoplastic material of the projection member melting the thermoplastic material; and
   cooling of the thermoplastic material of the projection member such that the thermoplastic material of the projection member solidifies and adheres to the cap member and the structure securing the cap member to the structure.

19. A method for installing a protection cap system for enclosing an end portion of a fastener which extends through a structure of an aircraft, comprising the steps of:
   positioning a projection member of the protection cap system, constructed of a thermoplastic material, into an opening of the structure,
   positioning a cap member of the protection cap system, which is separate from the projection member, onto the structure, wherein the cap member has a sidewall defining:
      an opening and an interior space, wherein the opening is aligned with the interior space, such that the end portion of the fastener extends through the opening and into the interior space with positioning of the cap member onto the structure; and
      an end surface which abuts the structure and overlies the projection member with positioning of the cap member onto the structure;
   applying one of heat or ultrasound to the thermoplastic material of the projection member melting the thermoplastic material; and
   cooling of the thermoplastic material of the projection member such that the thermoplastic material of the projection member solidifies and adheres to the end surface of the cap member and to the structure securing the cap member to the structure.

20. A method for installing a protection cap for enclosing an end portion of a fastener which extends through a structure of an aircraft, comprising the steps of:
   positioning the protection cap onto the structure, wherein the protection cap has a sidewall defining:
      an opening and an interior space, wherein the opening is aligned with the interior space such that the end portion of the fastener extends through the opening and into the interior space with positioning the protection cap onto the structure; and
      an end portion of the sidewall of the protection cap constructed of a thermoplastic material which includes an end surface which abuts the structure with positioning the protection cap onto the structure, and a projection member is secured to the end surface and positioned to extend within an opening of the structure; and
   applying one of heat or ultrasound to the end portion of the sidewall of the protection cap and melting the thermoplastic material of the end portion of the sidewall; and
   cooling the end portion of the sidewall of the protection cap such that the thermoplastic material of the end portion of the sidewall solidifies and adheres to the structure and to a remaining portion of the sidewall of the protection cap securing the protection cap to the structure.

21. The method of claim 18, wherein the end surface of the sidewall has a width dimension which extends from an inside edge of the sidewall to an outside edge of the sidewall.

22. The method of claim 21, wherein the projection member is positioned between the inside edge and the outside edge of the end surface.

23. The method of claim 22, wherein the projection member extends in a direction transverse from the end surface.

24. The method of claim 18, wherein:
   the projection member comprises a wall member, which has an inner wall surface which is a first radial distance from a central axis of the cap member and an outer wall surface is a second radial distance from the central axis; and
   the second radial distance is greater than the first radial distance.

25. The method of claim 24, wherein a width dimension of the wall member between the inner wall surface and the outer wall surface is a predetermined dimension to create an interference fit with positioning the wall member in the opening of the structure.

26. The method of claim 18, wherein the projection member comprises a post member positioned extended from the end surface of the sidewall.

27. The method of claim 26, further includes a plurality of post members which are spaced apart from one another.

* * * * *